Patented Mar. 20, 1951

2,545,978

UNITED STATES PATENT OFFICE 2,545,978

$\Delta^{8,9}$-11-KETO-STEROIDS AND METHOD OF PRODUCING THEM

Homer E. Stavely, Highland Park, N. J., assignor to E. R. Squibb & Sons, New York, N. Y., a corporation of New York No Drawing. Application February 10, 1945,
Serial No. 577,337

9 Claims. (Cl. 260—397.1)

1

This invention relates to the introduction of oxygen into the steroid nucleus at carbon atom 11, a step essential to the synthesis of corticosterone and other cortical hormones, and useful in the synthesis of other valuable steroids.

The position-numbering employed herein for the steroids is that generally employed in designating positions in cyclopenteno-phenanthrenes, i. e.,

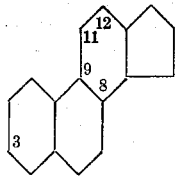

Although certain 11-keto-steroids have been obtained heretofore from the corresponding $\Delta^{11,12}$ steroids by a method involving the addition of the HO and Br components of hypobromous acid to the 11,12 double bond, the yields were so poor as to render the process unpractical.

It is the primary object of this invention to provide a simple and relatively efficient method of producing 11-keto-steroids; another object of this invention is the provision of $\Delta^{8,9}$-11-keto-steroids and of a method of producing them; and further objects will be apparent from the disclosure following.

It has been found that 11-keto-steroids may be relatively efficiently obtained from the corresponding $\Delta^{9,11}$ steroids by a method involving the addition of the HO and Br components of hypobromous acid to the 9,11 double bond. Thus, methyl $\Delta^{9,11}$-3-acetoxy-cholenate (or other lower-alkyl ester of a $\Delta^{9,11}$-3-acyloxy-cholenic acid) may be converted into the corresponding lower-alkyl ester of 3-acyloxy-9-bromo-11-hydroxy-cholanic acid by treatment with aqueous N-bromo-acetamide (or other N-bromo-amide of a lower fatty acid); and the latter may be converted into the corresponding lower-alkyl ester of 3-acyloxy-11-keto-cholanic acid by treatment with an agent capable of converting an alicyclic hydroxy group into a keto group (e. g., an acidic solution of chromium trioxide) and with a dehalogenating agent ( e. g., zinc and acetic acid).

Alternatively, the treatment for removal of bromine may be employed before the conversion of the hydroxy group into a keto group, but in this case hydrogen bromide is removed, methyl $\Delta^{8,9}$-3-acetoxy-11-hydroxy-cholanate (or other lower-alkyl ester of $\Delta^{8,9}$-3-acyloxy-11-hydroxy-cholenic acid) being thus obtained. These lower-alkyl esters of 3-acyloxy acids may be converted by conventional procedures into the corresponding 3-acyloxy acids, lower-alkyl esters of 3-hydroxy-acids, or 3-hydroxy acids.

The following examples are illustrative of the invention:

Example 1

(a) 500 mg. methyl $\Delta^{9,11}$-3-acetoxy-cholenate (Helv. Chim. Acta, 26, 536, 1943) is dissolved in 50 cc. acetone, and a solution of 400 mg. crystalline N-bromo-acetamide in 10 cc. water is added. After standing at room temperature for about 16 hours, the reaction mixture is poured into 200 cc. water, and the resulting mixture is extracted with ether. The ether extract is washed with dilute aqueous alkali and then with water, dried over sodium sulfate, and evaporated to dryness at room temperature. The residue is essentially methyl 3 - acetoxy - 9 - bromo - 11 - hydroxy-cholanate.

(b) This residue is dissolved in 10 cc. glacial acetic acid, and a solution of 100 mg. chromium trioxide in 5 cc. acetic acid is added. After the reaction mixture has stood at room temperature for about 18 hours, 500 mg. zinc dust is added, and the mixture is heated on a steam bath for 20 minutes with continuous shaking. The resulting solution is separated from the zinc by decantation, and poured into 100 cc. water; the mixture is extracted with ether; and the ether extract is washed with dilute aqueous alkali and then with water, and evaporated to dryness. The residue is subjected to chromatographic fractionation on a column of alumina [a solution of the residue in petroleum ether being passed through the column, and the adsorbed material fractionally eluted with petroleum ether and then with a 1:1 mixture of petroleum ether and benzene, the desired fraction being recovered from the latter eluate]; and the fraction thus obtained is recrystallized from methanol. The product, methyl 3-acetoxy-11-keto-cholanate, melts at 127–129° C., and has an $\alpha_D$ of +71.

Alternatively, the initial reaction (with N-bromo-acetamide) may be effected in aqueous ethanol or a mixture of water and any other alcohol having less than five carbon atoms; and the pH of the initial reaction mixture may vary considerably, operation at a pH of about 4 (by addition of a mineral acid, e. g., hydrochloric) or at a pH of about 10 (by addition of an alkali, e. g., sodium hydroxide), for example, being feasible. The recrystallization of the fraction obtained by chromatographing may also be effected from (inter alia) aqueous ethanol, an acetonehexane mixture, or a mixture of water and any other alcohol having less than five carbon atoms.

*Example 2*

200 mg. methyl 3-acetoxy-9-bromo-11-hydroxy-cholanate (obtained as described in Example 1 (*a*) is dissolved in 5.0 cc. acetic acid, 200 mg. zinc dust is added, and the mixture is heated on the steam bath for 20 minutes, with shaking. The solution is then separated from the zinc dust by decantation, poured into water, and extracted with ether; and the ether solution is washed with dilute alkali to remove acetic acid and then with water; and the ether is removed by evaporation. The residue, essentially $\Delta^{8,9}$-3-acetoxy-11-hydroxy-cholanate, is then oxidized by the procedure described in Example 1 (*b*), and the oxidation product is subjected to chromatographic fractionation as described in Example 1 (*b*). Instead of methyl 3-acetoxy-11-keto-cholanate, there is thus obtained the corresponding compound with a double bond in the 8.9 position, namely methyl $\Delta^{8,9}$-3-acetoxy-11-keto-cholanate, melting at 145–148° C. The presence and position of the $\alpha,\beta$-unsaturated ketone group is shown by the fact that the compound has an ultra-violet absorption maximum at 252 millimicrons.

On total hydrolysis of the esters obtained (e. g., by heating with KOH in methanol for several hours) the corresponding hydroxy acids are obtained, inter alia, 3-hydroxy-11-keto-cholanic acid, and $\Delta^{8,9}$-3-hydroxy-11-keto-cholenic acid. By treatment of an ethereal solution of the hydroxy acids with diazomethane, the corresponding hydroxy-acid methyl esters are obtained, inter alia, methyl 3-hydroxy-11-keto-cholanate, and methyl $\Delta^{8,9}$-3-hydroxy-11-keto cholenate; and on treatment of the hydroxy acids with acetic anhydride (and a small amount of pyridine), the corresponding acylated hydroxy acids are obtained, inter alia, 3-acetoxy-11-keto-cholanic acid, and $\Delta^{8,9}$-3-acetoxy-11-keto-cholenic acid.

The reactants employed in the foregoing examples may of course be replaced by their equivalents: thus, one may employ other agents capable of adding the HO and Br components of hypobromous acid to a double bond, especially other N-bromo-amides of lower fatty acids; the acid solution of chromium trioxide may be replaced by other agents capable of converting an alicyclic hydroxy group to a keto group, inter alia, cupric oxide, aluminum tertiary alkoxides, and aluminum isopropoxide; and the debromination and dehydrobromination may be effected by dehydrohalogenation agents other than zinc and acetic acid, inter alia, sodium iodide.

The invention may be variously otherwise embodied within the scope of the appended claims.

I claim:

1. A process which comprises causing a cyclopentanopolyhydrophenanthrene which contains a nuclear double bond in 9,11-position to react in aqueous medium with an N-bromo-amide of a lower fatty acid, whereby an addition-product results wherein the 11-position is occupied by an OH-group and the 9-position by a bromine atom.

2. A process for the manufacture of a cyclopentanopolyhydrophenanthrene which contains a keto group in 11-position, which comprises causing a cyclopentanopolyhydrophenanthrene which contains a nuclear double bond in 9,11 position to react in aqueous medium with an N-bromo-amide of a lower fatty acid, whereby an addition-product results wherein the 11-position is occupied by an OH group and the 9-position by a bromine atom, and treating the addition-product with zinc and then with an acetic acid solution of chromium trioxide.

3. A process for the manufacture of a cyclopentanopolyhydrophenanthrene which contains a keto group in 11-position, which comprises causing a cyclopentanopolyhydrophenanthrene which contains a nuclear double bond in 9,11-position to react in aqueous medium with an N-bromo-amide of a lower fatty acid, whereby an addition-product results wherein the 11-position is occupied by an OH group and the 9-position by a bromine atom, and treating the addition-product with an acetic acid solution of chromium trioxide and then with zinc.

4. A process which comprises causing a lower-alkyl ester of a $\Delta^{9,11}$-3-acyloxy-cholenic acid to react in aqueous medium with N-bromo-acetamide, whereby an addition-product results wherein the 11-position is occupied by an OH group and the 9-position by a bromine atom.

5. A process for the manufacture of a lower-alkyl ester of a 3-acyloxy-11-keto-cholanic acid, which comprises causing a lower-alkyl ester of a $\Delta^{9,11}$-3-acyloxy-cholenic acid to react in aqueous medium with an N-bromo-amide of a lower fatty acid, whereby an addition-product results wherein the 11-position is occupied by an OH group and the 9-position by a bromine atom, and treating the addition product with an acetic acid solution of chromium trioxide into a keto group and then with zinc.

6. A process for the manufacture of a lower-alkyl ester of a $\Delta^{9,11}$-3-acyloxy-cholenic acid to react in aqueous medium with an N-bromo-amide of a lower fatty acid, whereby an addition-product results wherein the 11-position is occupied by an OH group and the 9-position by a bromine atom, and treating the addition-product with zinc.

7. A process for the manufacture of a cyclopentanopolyhydrophenanthrene which contains a keto group in 11-position, which comprises causing an acylated zymosterol to react in aqueous medium with an N-bromo-amide of a lower fatty acid, whereby an addition-product results wherein the 11-position is occupied by an OH group and the 9-position by a bromine atom, and treating the addition-product with an acetic acid solution of chromium trioxide into a keto group and then with zinc.

8. A lower-alkyl ester of a $\Delta^{8,9}$-3-acetoxy-11-keto-cholenic acid.

9. Methyl $\Delta^{8,9}$-3-acetoxy-11-keto-cholenate.

HOMER E. STAVELY.

REFERENCES CITED

The following references are of record in the file of this patent:

UNITED STATES PATENTS

| Number | Name | Date |
| --- | --- | --- |
| 2,323,277 | Miescher | June 29, 1943 |
| 2,341,250 | Wallis | Feb. 8, 1944 |
| 2,403,684 | Reichstein | July 9, 1946 |

OTHER REFERENCES

Longwell, Jour. Am. Chem. Soc., 62, pp. 200–203 (1940).

Chemical Abstracts, vol. 37, cols. 5032–5034 (1943), abstraction of an article of Ziegler in Annalen 551, pp. 80–119 (1942).